United States Patent
Liu

(10) Patent No.: US 7,852,088 B2
(45) Date of Patent: Dec. 14, 2010

(54) HIGH RESOLUTION MAGNETOTELLURIC METHOD FOR REMOVING STATIC FREQUENCY DOMAIN

(75) Inventor: Junchang Liu, Tianjin (CN)

(73) Assignee: Tianjin Geophysical Exploration Center, Tianjin (CN)

( * ) Notice: Subject to any disclaimer, the term of this patent is extended or adjusted under 35 U.S.C. 154(b) by 0 days.

(21) Appl. No.: 12/541,919

(22) Filed: Aug. 15, 2009

(65) Prior Publication Data

US 2009/0302853 A1 Dec. 10, 2009

Related U.S. Application Data

(63) Continuation of application No. PCT/CN2007/000766, filed on Mar. 9, 2007.

(30) Foreign Application Priority Data

Mar. 8, 2007 (CN) .................. 2007 1 0056887

(51) Int. Cl.
*G01V 3/08* (2006.01)
(52) U.S. Cl. ...................... 324/350; 324/348
(58) Field of Classification Search .............. 324/348, 324/349, 350; 702/2, 5
See application file for complete search history.

(56) References Cited

U.S. PATENT DOCUMENTS

| 4,835,473 A * | 5/1989 | Bostick, Jr. ............... 324/357 |
| 4,862,089 A * | 8/1989 | Sigal ........................ 324/350 |
| 5,043,667 A * | 8/1991 | Schofield ................. 324/350 |
| 2005/0134278 A1* | 6/2005 | Nichols ..................... 324/348 |

* cited by examiner

*Primary Examiner*—Kenneth J Whittington
(74) *Attorney, Agent, or Firm*—Matthias Scholl P.C.; Matthias Scholl

(57) ABSTRACT

A method for removing a static frequency domain, by (1) installing multiple sampling devices; (2) performing conventional processing whereby obtaining conventional observation curves; (3) adding electric-filed components of two adjacent observation points, those of three adjacent observation points, and adding electric field components of up to n adjacent observation points whereby obtaining electric fields of different polar distance, i.e. a sequence of electric field components of topology points; (4) using the sequence of the electric field components and the encrypted topology points sequence as an observation field value to perform power spectrum analysis and impedance tensor estimate; (5) drawing a resistance-variation of polar distance curve of a single frequency point of the record point; observing and analyzing a variation rule of resistivity, editing and deleting static interference resistance; and (6) repeating the previous step to complete edition of all frequency points of all record points.

2 Claims, 2 Drawing Sheets

HIGH RESOLUTION MAGNETOTELLURIC METHOD FOR REMOVING STATIC FREQUENCY DOMAIN

CROSS-REFERENCE TO RELATED APPLICATIONS

This application is a continuation of International Patent Application No. PCT/CN2007/000766 with an international filing date of Mar. 9, 2007, designating the United States, now pending, and further claims priority benefits to Chinese Patent Application No. 200710056887.6 filed Mar. 8, 2007. The contents of all of the aforementioned applications, including any intervening amendments thereto, are incorporated herein by reference.

BACKGROUND OF THE INVENTION

1. Field of the Invention

The invention relates to the field of geophysical exploration, and more particularly to a high resolution magnetotelluric method for removing a static frequency domain.

2. Description of the Related Art

A magnetotelluric method is an important geophysical exploration method widely used in energy, metal ores, groundwater, engineering and marine resources exploration and many other fields. The frequency-domain magnetotelluric method is the most widely used method of the magnetotelluric method.

The frequency-domain magnetotelluric method tests vertical variation of underground medium via a pair of static electric field observation-electrodes disposed at the surface of the area to be explored, a pair of magnetic probes corresponding and perpendicular to the static electric field observation-electrodes, a magnetic probe disposed in a vertical direction, and a sampling device connected to the electrodes and probe, whereby bringing great convenient for construction and improving production efficiency.

However, the existing frequency-domain magnetotelluric method has the following problems: a static effect is generated, which causes electric false anomaly of a horizontal and continuous geoelectric geologic body, and makes it possible to treat and analysis the geologic body; moreover, the method selects frequency points that are uniformly distributed on a logarithmic coordinate as observation frequency points, which decreases vertical resolution.

BRIEF SUMMARY OF THE INVENTION

In view of the above-described problems, it is one objective of the invention to provide a high resolution magnetotelluric method capable of removing a static frequency domain and improving vertical resolution.

To achieve the above objective, in accordance with one embodiment of the invention, provided is a high resolution magnetotelluric method for removing a static frequency domain, comprising steps of: (1) installing multiple sampling devices at the surface of the area to be explored in a form of an array, adjacent observation points sharing a same electrode; (2) performing conventional processing on all observation results whereby obtaining conventional observation curves of the observation points; (3) for the time series data of the original observation value of the electric field along the same direction of all observation points, adding electric-filed components of two adjacent observation points, those of three adjacent observation points, . . . , and those of all points whereby obtaining electric fields of different polar distance, i.e. a sequence of electric field components of topology points and encrypted topology points; (4) using the sequence of the electric field components of the topology points sequence and the encrypted topology points sequence obtained above as an observation field value to perform power spectrum analysis and impedance tensor estimate, whereby obtaining a series of topological observation curves of a same record point; (5) drawing a resistance—variation of polar distance curve of a single frequency point of the record point; observing and analyzing a variation rule of resistivity, editing and deleting static interference resistance, whereby obtaining a resistivity value of the point at the frequency; and (6) repeating the previous step to complete edition of all frequency points of all record points, whereby obtaining observation results without the static frequency domain.

In certain classes of this embodiment, the step of using said sequence of the electric field components of the topology points sequence and the encrypted topology points sequence obtained above as an observation field value to perform power spectrum analysis and impedance tensor estimate: sampling using cascade decimation; extracting a reference frequency point with a cycle of $2^i T_0$, $T_0$ being 32-time sampling interval, and i being a sub-sample series; and performing Fourier transformation between a time interval of $2^i T_1$ to $2^{i+1} T_1$, whereby obtaining the eighth harmonic wave as an encrypted power spectrum and improving vertical resolution.

The high resolution magnetotelluric method for removing a static frequency domain of the invention has the following advantages:

(1) the static effect is removed via topology processing;

(2) the vertical resolution is improved by increasing observation cycle at an equal interval;

(3) an geological effect more closer to an actual one is obtained and thus comprehensive underground information can be directly indicated; and (4) interference and false anomaly are removed.

DETAILED DESCRIPTION OF THE INVENTION

As mentioned above, a main reason for a static effect is that a spatial location of an observation device is fixed. Therefore, if an optimal response frequency band (or a certain frequency) is observed by different observation devices, an additional electric field generated by accumulated charge at a non-uniform interface is reduced or eliminated as a result of the change of the observation devices. Meanwhile, the whole observation curve is not affected in the whole frequency band.

A high resolution magnetotelluric method for removing a static frequency domain of the invention performs topological processing with the time observation data during continuous profile observation whereby obtaining observation results of a corresponding frequency band via the optimal observation device.

Detailed description of this invention will be given below in conjunction with accompanying drawings.

Figure 1:
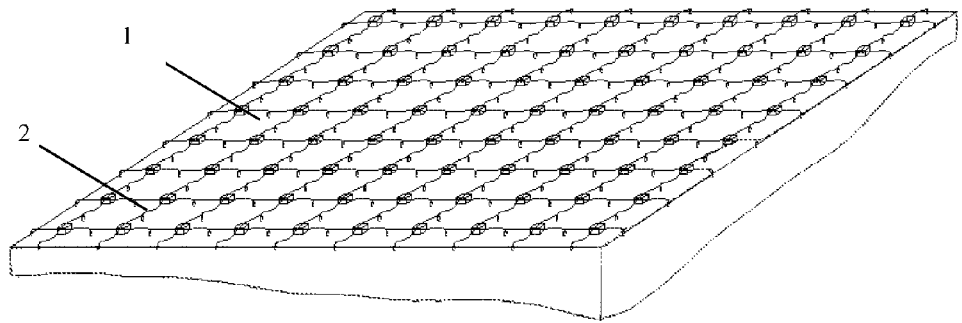
FIG. 1 is a schematic view illustrating an application environment of a high resolution magnetotelluric method for removing a static frequency domain of the invention.

A high resolution magnetotelluric method for removing a static frequency domain of the invention comprises (1) as shown in FIG. 1, installing multiple sampling devices 1 on the surface of an area to be explored in a form of an array, adjacent observation points sharing a same electrode 2.

Figure 2:
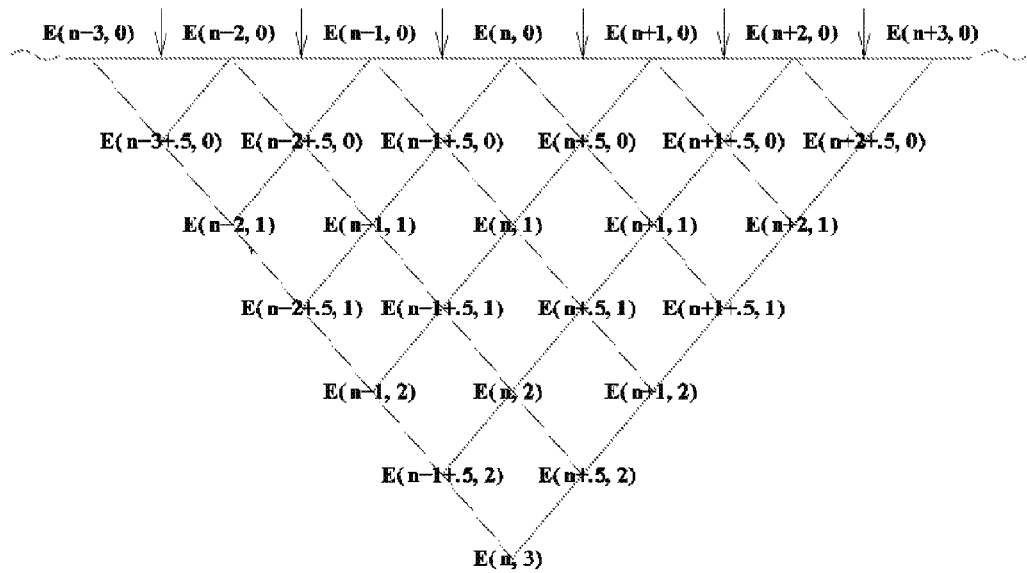
FIG. 2 is a topology diagram of electric field components in a same direction of a high resolution magnetotelluric method for removing a static frequency domain of the invention.

(2) performing conventional processing on all observation results whereby obtaining conventional observation curves of the observation points (3) as shown in FIG. 2, for the time series data of the original observation value of the electric field along the same direction of all observation points, adding electric-filed components of two adjacent observation points, those of three adjacent observation points, . . . , and those of all points whereby obtaining electric fields of different polar distance, i.e. a sequence of electric field components of topology points and encrypted topology points. The step comprises:

i. selecting a record point n as a center; denoting an original observation value as (n, 0), editing a point topology to both sides thereof to generate a new point denoted as (n, 1), adding i point topologies to generate a point (n, i), and obtaining an electric field component of a topology point sequence as follows:

$$E(n, i) = \frac{\sum_{k=-i}^{k=i} E(n-k)}{1+2i} (i \geq 0)$$

ii. averaging the record points n and n+1 and obtaining an encrypted point denoted as n+0.5; selecting the points n and n+1 as a center, adding a point topology on both sides thereof to generate a new point denoted as (n+0.5,1); adding i point topologies to generate a new point denoted as (i+0.5,1); and so on, and obtaining an electric field component of an encrypted topology point sequence as follows:

$$E(n+0.5, i) = \frac{\sum_{k=0}^{k=i} E(n-k) + \sum_{k=0}^{k=i} E(n+1+k)}{2+2i} (i \geq 0)$$

(Note: the above two formulas are applied to a linear profile with a same point distance. For a linear profile with different point distance, the point distance is weighted average.)

(4) using the sequence of the electric field components of the topology points sequence and the encrypted topology points sequence obtained above as an observation field value to perform power spectrum analysis and impedance tensor estimate, whereby obtaining a series of topological observation curves of a same record point field value.

Figure 3:
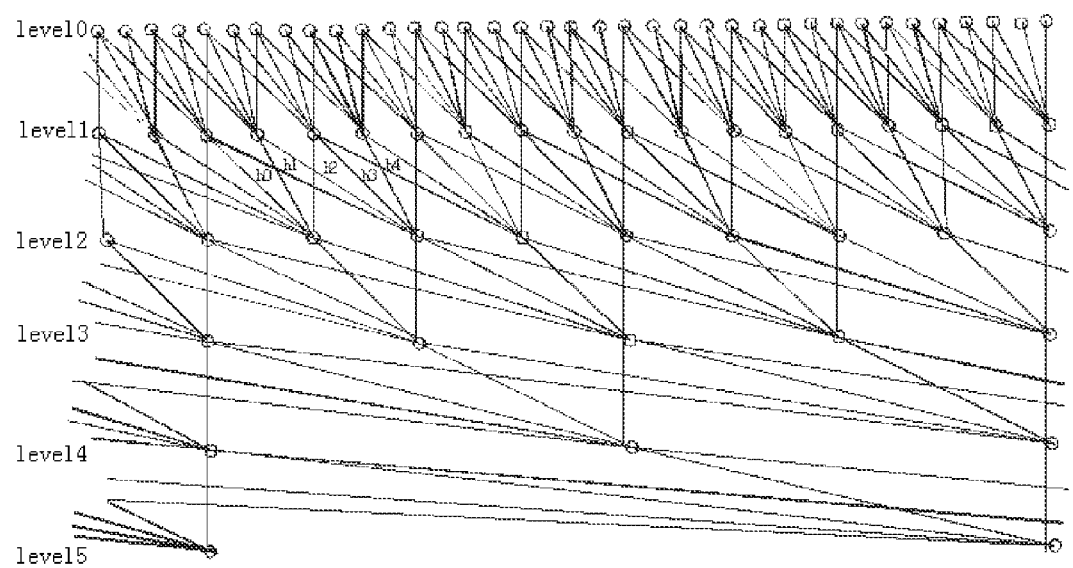
FIG. 3 illustrates cascade decimation of a high resolution magnetotelluric method for removing a static frequency domain of the invention.

In detail, the step comprises sampling using cascade decimation as shown in FIG. 3; extracting a reference frequency point with a cycle of $2^i T_0$, $T_0$ being 32-time sampling interval, and i being a sub-sample series; and performing Fourier transformation between a time interval of $2^i T_1$ to $2^{i+1} T_1$, whereby obtaining the eighth harmonic wave as an encrypted power spectrum and improving vertical resolution.

The Fourier transform formula is as follows:

$$\begin{cases} X(k) = \sum_{n=0}^{n=N-1} x(n) W_N^{8n} \\ k = i\frac{32}{l} + m \\ W_N = e^{-j\omega} \\ \omega = \frac{2\pi}{\Delta T_N \cdot N} \end{cases}$$

Where, N is the number of transformed samples, $32 \leq N < 64$, and N is an even number; $\Delta T_N$ is a sampling interval corresponding to N; k is the serial number of a frequency point; i is sampling series; m is an encrypted frequency point serial number of a sampling band of i series; l is extended time domain interval of the encrypted frequency point.

(5) drawing a resistance—variation of polar distance curve of a single frequency point of the record point; observing and analyzing a variation rule of resistivity, editing and deleting static interference resistance, whereby obtaining a resistivity value of the point at the frequency (6) repeating the previous step to complete edition of all frequency points of all record points, whereby obtaining observation results without the static frequency domain.

The above mentioned method deals with an electric field component in one direction only. As for an electric field component in another direction, the processing method during network-type observation is the same. As for a magnetic field component, the process method is the same as the traditional observation method and requires no additional processing.

In addition, a suitable sampling frequency and observation distance are needed in installing the observation device in step (1) to improve a sampling effect and construction efficiency.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A high resolution magnetotelluric method for removing a static frequency domain, comprising steps of:
    (1) installing multiple sampling devices at the surface of the area to be explored in a form of an array, adjacent observation points sharing a same electrode;
    (2) performing conventional processing on all observation results whereby obtaining conventional observation curves of said observation points;
    (3) for the time series data of the original observation value of the electric field along the same direction of all observation points, adding electric-filed components of two adjacent observation points, those of three adjacent observation points, and adding electric field components of up to n adjacent observation points whereby obtaining electric fields of different polar distance as a sequence of electric field components of topology points and encrypted topology points;
    (4) using said sequence of the electric field components of the topology points sequence and the encrypted topology points sequence obtained above as an observation field value to perform power spectrum analysis and impedance tensor estimate, whereby obtaining a series of topological observation curves of a same record point;

(5) drawing a resistance-variation of polar distance curve of a single frequency point of the record point; observing and analyzing a variation rule of resistivity, editing and deleting static interference resistance, whereby obtaining a resistivity value of the point at the frequency; and (6) repeating the previous step to complete edition of all frequency points of all record points, whereby obtaining observation results without the static frequency domain.

2. The high resolution magnetotelluric method of claim 1, wherein the step of using said sequence of the electric field components of the topology points sequence and the encrypted topology points sequence obtained above as an observation field value to perform power spectrum analysis and impedance tensor estimate comprises:

sampling using cascade decimation;

extracting a reference frequency point with a cycle of $2^i T_0$, $T_0$ being 32-time sampling interval, and i being a sub-sample series; and performing Fourier transformation between a time interval of $2^i T_1$ to $2^{i+1} T_1$, whereby obtaining the eighth harmonic wave as an encrypted power spectrum and improving vertical resolution.

* * * * *